United States Patent [19]

Hishiro et al.

[11] Patent Number: 5,686,585
[45] Date of Patent: Nov. 11, 1997

[54] AZO DYES FOR USE IN COLOR FILTERS AND METHOD FOR PRODUCTION OF COLOR FILTERS

[75] Inventors: Yoshiki Hishiro, Toyonaka; Naoki Takeyama, Settsu; Shigeki Yamamoto, Ibaraki, all of Japan

[73] Assignee: Sumitomo Chemical Company, Limited, Osaka, Japan

[21] Appl. No.: 313,101

[22] PCT Filed: Feb. 1, 1994

[86] PCT No.: PCT/JP94/00135

§ 371 Date: Nov. 18, 1994

§ 102(e) Date: Nov. 18, 1994

[87] PCT Pub. No.: WO94/18274

PCT Pub. Date: Aug. 18, 1994

[30] Foreign Application Priority Data

Feb. 2, 1993 [JP] Japan .................. 5-015364

[51] Int. Cl.⁶ .................. C09B 29/28; C09B 29/46; C09B 35/03; G03F 9/00
[52] U.S. Cl. .................. 534/872; 534/649; 534/793; 534/759; 534/760; 534/864; 534/879; 534/880; 430/7; 430/321; 430/191
[58] Field of Search .................. 534/793, 759, 534/760, 864, 872, 879, 880; 430/7, 321

[56] References Cited

U.S. PATENT DOCUMENTS

| | | | |
|---|---|---|---|
| 3,346,550 | 10/1967 | Geselbracht et al. | 534/698 |
| 4,268,624 | 5/1981 | Fujita et al. | 430/562 |
| 4,425,422 | 1/1984 | Komamura et al. | 430/242 |
| 4,524,124 | 6/1985 | Bergthaller et al. | 430/241 |
| 4,808,501 | 2/1989 | Chiulli | 430/7 |
| 5,155,005 | 10/1992 | Sato et al. | 430/7 |
| 5,268,245 | 12/1993 | Chiulli | 430/7 |
| 5,362,598 | 11/1994 | Takayama et al. | 430/191 |

FOREIGN PATENT DOCUMENTS

| | | |
|---|---|---|
| 0003376 | 1/1979 | European Pat. Off. |
| 0132577 | 6/1984 | European Pat. Off. |
| 2407498 | 10/1978 | France |
| 130285 | 3/1978 | Germany |
| 64-88505 | 4/1989 | Japan |
| 1-293339 | 11/1989 | Japan |
| 108004 | 4/1990 | Japan |
| 2-167504 | 6/1990 | Japan |
| 2-287402 | 11/1990 | Japan |
| 4-283701 | 10/1992 | Japan |
| 567550 | 2/1972 | Switzerland |

OTHER PUBLICATIONS

Oppenkowski et al, Chemical Abstracts, 91:47300s (1979).
Takeyama et al, Chemical Abstracts, 114:33214y (1991).
Chemical Abstracts, Chemical Substance Index, Part 3, vol. 92, p. 3608 CS (1980).
Wawrzyniak, Chemical Abstracts, vol. 92, No. 60268c (1980).

*Primary Examiner*—Fiona T. Powers
*Attorney, Agent, or Firm*—Birch, Stewart, Kolasch & Birch, LLP

[57] ABSTRACT

An azo dye for use in color filters soluble in alkaline aqueous solutions and organic solvents and having in one molecule at least one sulfonamido group of which one hydrogen atom is substituted; and a method for producing a color filter having a plurality of color filter elements which comprises the steps of a) coating a substrate with an organic solvent solution of a photoresist composition containing said azo dye and drying the coat to form an adhering layer, b) exposing a specific part of said layer to radiation ray, c) developing the exposed or unexposed region with alkali to form a colored pattern, and d) repeating the steps a)–c) on every dye of different color present in said composition.

11 Claims, No Drawings

5,686,585

AZO DYES FOR USE IN COLOR FILTERS AND METHOD FOR PRODUCTION OF COLOR FILTERS

TECHNICAL FIELD

This invention relates to azo dyes for use in color filters, and more particularly to magenta-colored, red-colored or yellow-colored azo dyes for use in color filters.

BACKGROUND ART

Color filters, particularly the color filters used in solid-state image sensors such as charge combination device (CCD), liquid crystal display device (LCD) and the like, are usually produced by first forming a pattern from a photoresist and subsequently dyeing the pattern. However, this method is disadvantageous in that the dyeing process is complicated and difficult to control. Thus, JP-A-4-163552 and JP-A-4-128703 have proposed methods for producing color filters by patterning a photoresist containing a dyestuff such as pigment or dye. However, the method of JP-A-4-163552 is not suitable for production of color filters for use in CCD requiring a high resolution, because the pigment itself used therein contains particles of about 1 μm size. On the other hand, the method of JP-A-4-128703 is inferior in the stability of colored pattern. In addition to the above, these methods both involve another important problem. That is, usual dyestuffs exist as an extraneous matter different from the alkali-developable resist. In the case of producing a color filter, the preferable thickness of resist film is 1 μm or less, unlike the case of producing a semi-conductor. For this reason, a large amount of dyestuffs must be added to a resist composition comprising an alkali-soluble resin and an organic solvent. Actual dyestuffs, however, are soluble in neither of aqueous alkali solution and organic solvent, and therefore it is difficult to prepare a fine color pattern having a desired spectrum and a small film thickness from such dyestuffs.

DISCLOSURE OF INVENTION

This invention solves the above-mentioned problem by providing an azo dye for use in color filters excellent in spectral characteristics such as light absorption characteristic, permeation characteristic, etc. which can be used for preparing a resist composition for color filters excellent in properties such as resolution and free from scum, namely undeveloped residue, and to a method for producing color filters by the use of a photoresist composition containing said azo dye.

This invention relates to an azo dye for use in color filters which has in one molecule at least one sulfonamido group of which one hydrogen atom is substituted and is soluble in alkaline aqueous solution and organic solvents. Further, this invention also relates to a method for producing a color filter having a plurality of colored filter elements which comprises the steps of:

a) forming on a substrate an organic solvent-coating of a photoresist composition containing an azo dye and drying the organic solvent-coating to form an adhering layer, provided that, in this step, said composition contains an alkali soluble resin and the above-mentioned azo dye, said dye is present in the organic solvent solution of the alkali soluble resin and the dye constituting said photoresist composition in an amount of ¼ or more as expressed in terms of ratio by weight based on the alkali soluble resin, said dye has in one molecule at least one sulfonamido group of which one hydrogen atom is substituted, said dye has a desired color depth and has a specific absorption characteristic and a specific transmitting characteristic of a specific color demanded of the color filter element to be produced from said photoresist composition, said dye has a sufficient transmittance to the radiation ray used for exposure of the photoresist composition and has a sufficient solubility in the aqueous alkaline solution used in the alkali development mentioned below, and the pattern of the filter element formed by the development has the above-mentioned specific absorption characteristic and permeation characteristic;

b) exposing a specific part of the above-mentioned adhering layer to one radiation ray selected from the group consisting of ultraviolet ray, far ultraviolet ray, electron beam, X ray and ion beam;

c) developing the exposed region or unexposed region with alkali to form a pattern of the above-mentioned filter element; and d) repeating the steps a) to c) on every dye of different color present in the above-mentioned composition.

BEST EMBODIMENT FOR PRACTICE OF THE INVENTION

Among the azo dyes for use in color filters according to this invention, preferable magenta- or red-colored dyes are, for example, those having a chromophore structure represented by one of the following formulae:

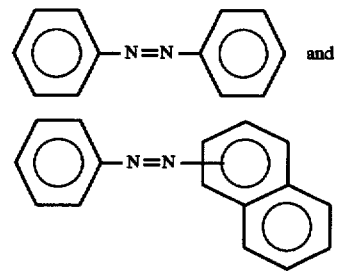

and preferable yellow-colored dyes are, for example, those having a chromophore structure represented by the following formula:

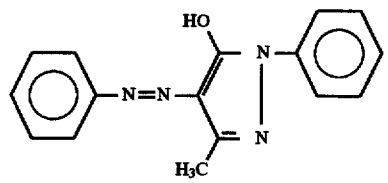

As concrete examples of preferable magenta- and red-colored dyes, there can be mentioned azo dyes represented by the following formulae:

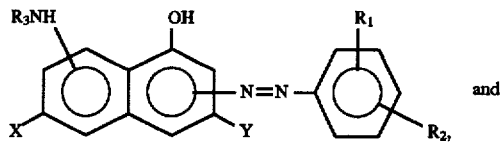

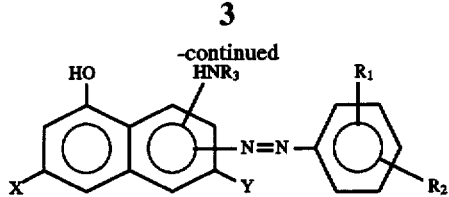

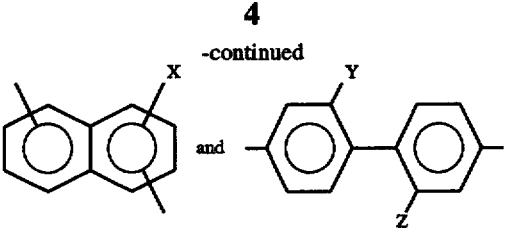

wherein $R_1$ and $R_2$ each independently represents hydrogen atom, halogen atom, alkyl group, aryloxy group, alkylcarbonylamino group, arylcarbonylamino group, alkylaryloxy group, dialkylaryloxy group, sulfonic acid group or —$SO_2NHR$ group in which R represents alkyl, cycloalkyl, cyclohexylalkyl, alkylcarbonylaminoalkyl, alkoxy, alkoxyalkyl, aryl or alkylcarbonyloxy group which may be substituted, $R_3$ represents lower alkylcarbonyl group, arylcarbonyl group or arylsulfonyl group, and X and Y each independently represents sulfonic acid group or —$SO_2NHR$, provided that at least one of $R_1$, $R_2$, X and Y is —$SO_2NHR$.

As concrete examples of preferable yellow-colored dye, there can be mentioned azo dyes represented by the following formula:

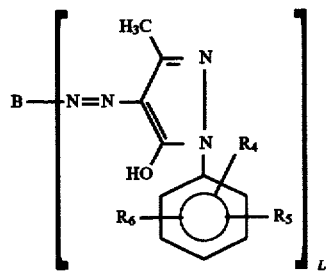

wherein $R_4$, $R_5$ and $R_6$ each independently represents hydrogen atom, halogen atom, sulfonic acid group or —$SO_2NHR$ in which R is as defined above, L represents 1 or 2, and when L is 2, B represents a group represented by one of the following formulae:

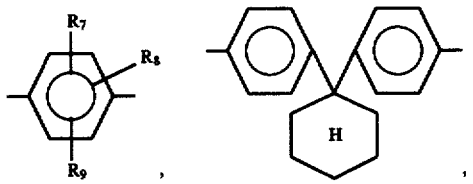

in which $R_7$, $R_8$ and $R_9$ each independently represents hydrogen atom, methyl group, sulfonic acid group or —$SO_2NHR$ (R is as defined above), and X, Y and Z each independently represents sulfonic acid group or —$SO_2NHR$ in which R is as defined above, provided that at least one of $R_4$ to $R_9$ and X to Z is —$SO_2NHR$ in which R is as defined above and when L is 1, B represents a group represented by one of the following formulae:

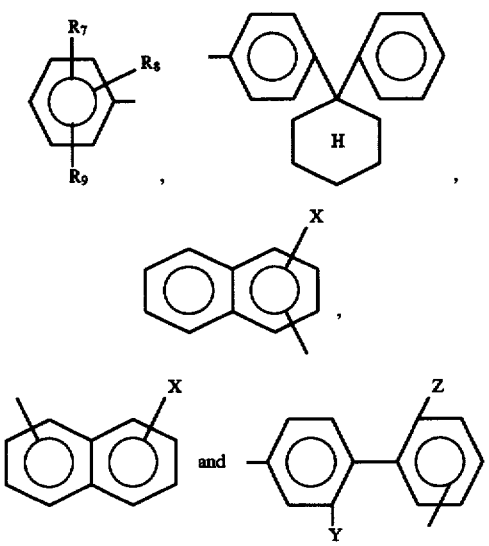

wherein $R_7$, $R_8$, $R_9$, X and Y are as defined above.

Preferable concrete examples of the azo dye for use in color filters according to this invention include the following:

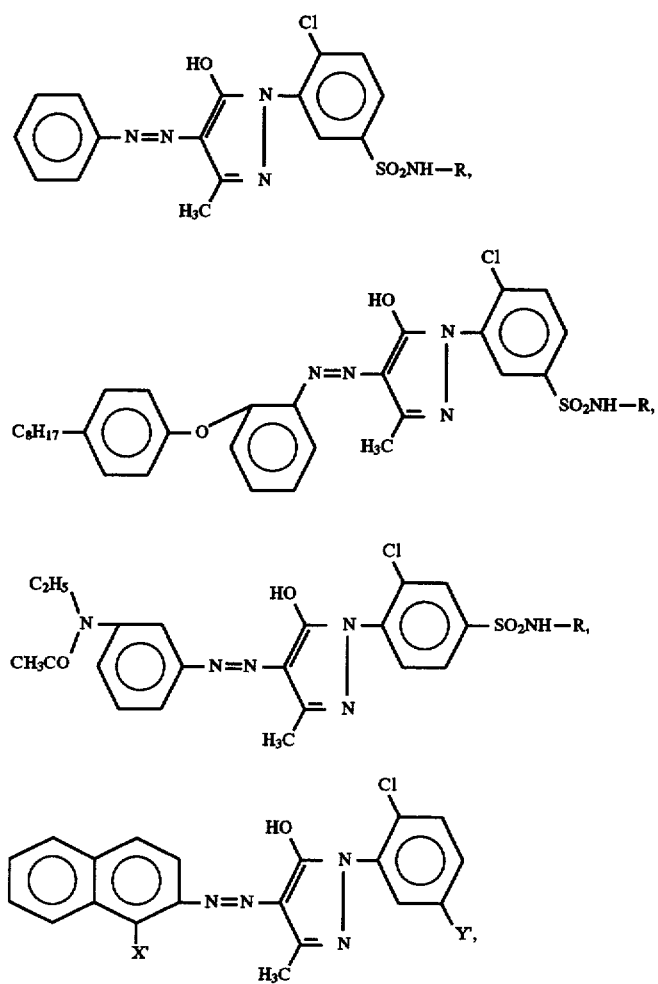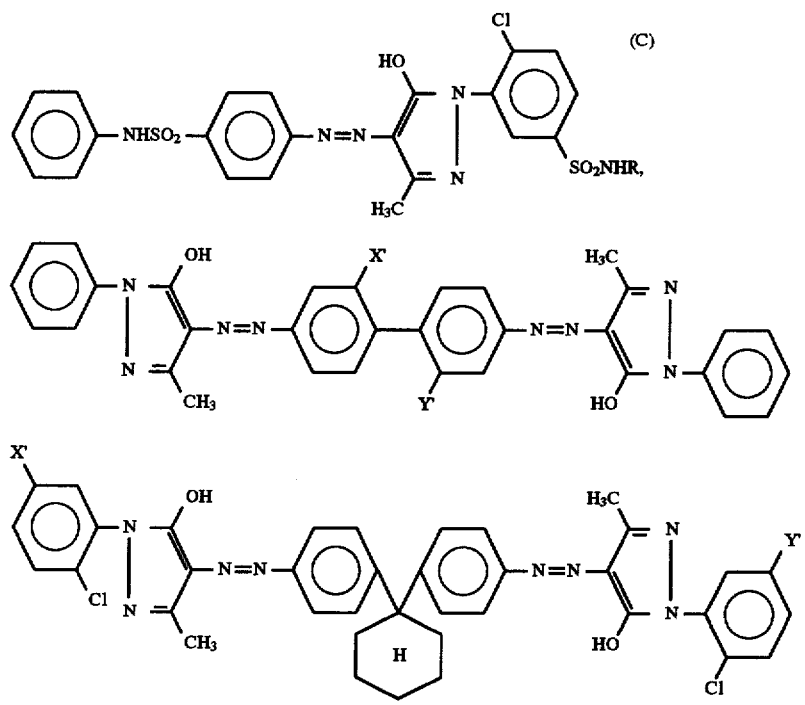

-continued

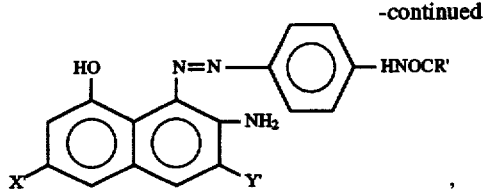

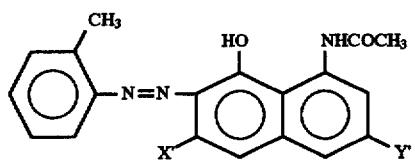

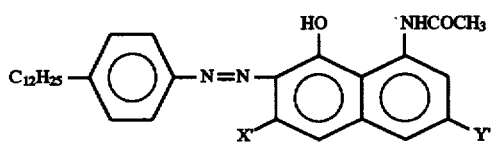

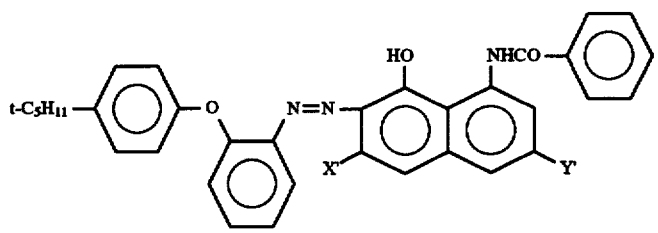

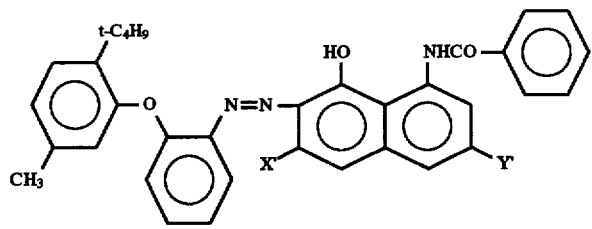

wherein X' and Y' each represents sulfonic acid group or —SO₂NH—R (R is as defined above) provided that at least one of X' and Y' is —SO₂NH—R, and R' represents alkyl group or aryl group.

Preferable examples of R include $C_nH_{2n+1}$ wherein n is an integer not smaller than 1 and preferably an integer not smaller than 3 and not larger than 30, $C_nH_{2n+1}OC_mH_{2m+1}$ wherein n and m each represents an integer not smaller than 1 provided that n+m is an integer not smaller than 3 and not larger than 30, groups represented by the following formula:

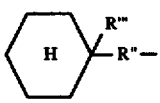

wherein R'" is alkyl group having 1–10 carbon atoms or hydrogen atom and R" is alkylene group having 1–20 carbon atoms, and the like, provided that all the above-mentioned groups may additionally be substituted with appropriate substituents.

The azo dye for use in color filters can be produced by, for example, chlorinating a dye or a dye intermediate having sulfonic acid group in the usual manner to obtain a dye or a dye intermediate having —SO₂Cl group, and thereafter reacting the product thus obtained with an amine represented by the following formula:

RNH₂ wherein R is as defined above. When a dye intermediate is used in the chlorination reaction, the intended azo dye can be derived therefrom by an appropriately selected reaction. The dyes having sulfonic acid group may be appropriately selected from C. I. Acid Colour, C. I. Direct Colour and the like listed in Colour Index. In order to satisfy the preferred condition of this invention that the compound used should be soluble in both of alkaline aqueous solution and organic solvent, those compounds having at least one —SONHR (R is as defined above) in one molecule and having no free sulfonic acid group should be selected.

As preferable azo dyes for use in color filters, dyes having in one molecule at least one sulfonamido group of which one hydrogen atom is substituted and existing in an amount of ¼ by weight or more based on the weight of alkali soluble resin in an organic solvent solution containing an alkali soluble resin and said dye can be mentioned.

In the production of the color filter of this invention, the above-mentioned azo dye for use in color filters is preferably used in the form of a combined mixture of two or more dyes.

Examples of the organic solvent which can be used in the photoresist composition of this invention include methyl cellosolve, ethyl cellosolve, methyl cellosolve acetate, ethyl cellosolve acetate, diethylene glycol dimethyl ether, ethylene glycol monoisopropyl ether, propylene glycol monomethyl ether, N,N-dimethylacetamide, N-methylpyrrolidone, γ-butyrolactone, methyl isobutyl ketone, methyl ethyl ketone, cyclopentanone, cyclohexanone, ethyl acetate, n-butyl acetate, propylene glycol monomethyl ether acetate, propylene glycol monoethyl ether acetate, methyl lactate, ethyl lactate, ethyl pyruvate, dimethyl sulfoxide, dioxane, dimethylformamide and the like. These organic solvents are used either independently or in combination of two or more.

Examples of the alkali soluble resin which can be used in the photoresist composition include novolac resin, vinyl polymers and the like.

As examples of said novolac resin, those prepared through a condensation reaction between a phenol compound and an aldehyde compound in the presence of an acid catalyst can be mentioned. As examples of said phenol compound, phenol, cresol, ethylphenol, butylphenol, xylenol, phenylphenol, catechol, resorcinol, pyrogallol, naphthol, Bisphenol A and the like can be mentioned. These phenol compounds are used either independently or in combination of two or more. As examples of said aldehyde compound, formaldehyde, paraformaldehyde, acetaldehyde, propionaldehyde, benzaldehyde and the like can be mentioned. As concrete examples of said novolac resin, novolac resins prepared through a condensation reaction between formaldehyde and m-cresol, p-cresol or a mixture thereof can be mentioned. If desired, molecular weight of these novolac resins may be regulated by means of fractionation or the like. A low molecular weight component such as Bisphenol C, Bisphenol A or the like having phenolic hydroxyl groups may be mixed into said novolac resin.

Examples of said vinyl polymer include styrene/p-hydroxystyrene copolymers (for example, MARUKALYNCUR-CST manufactured by Maruzen Oil Co., Ltd. and the like), styrene/maleic anhydride copolymers (for example, SMA-2625 and SMA-17352 manufactured by Ato-Chemi Co., and the like), acrylic monomer/p-vinylphenol copolymers (for example, MARUKALYNCUR-CMM manufactured by Maruzen Oil Co., Ltd., and the like), vinyl alcohol/p-vinylphenol copolymers, (for example, MARUKALYNCUR-CHM manufactured by Maruzen Oil Co., Ltd., and the like), methyl methacrylate (or methyl acrylate)/maleic anhydride copolymers, partially esterified products formed between the above-mentioned copolymers and an alcohol having $C_{1-10}$ alkyl or cycloalkyl group, vinylphenol copolymers such as a copolymer having a structure represented by the following formula:

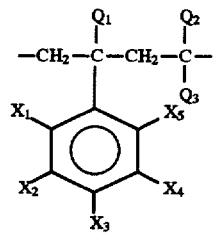

wherein $Q_1$ and $Q_2$ each independently represents hydrogen atom or alkyl group, $Q_3$ represents alkyl, aryl, alkoxy, hydroxyalkyl or alkylcarbonyloxy group, and $X_1$ to $X_5$ each represents hydrogen atom, halogen atom, alkyl group or hydroxyl group, provided that at least one of $X_1$ to $X_5$ is hydroxyl group, resins prepared by hydrogenating a polyvinylphenol (for example, MARUKALYNCUR-PHS-C manufactured by Maruzen Oil Co., Ltd., and the like), and polyvinylphenols (for example, MARUKALYNCUR-M manufactured by Maruzen Oil Co., Ltd., and the like). These vinyl polymers may be used either independently or in combination of two or more. Of these vinyl polymers, those having a molecular weight of about 500 to 10,000 may be selected in accordance with demand.

Said vinyl polymers may be used in the form of a mixture with the above-mentioned novolac resins.

A photoresist composition preferably contains a crosslinking agent in addition to the azo dye for use in color filters, an organic solvent and an alkali soluble resin according to this invention.

As examples of said crosslinking agent, melamine and compounds having a group represented by the following formula:

wherein $R_0$ represents hydrogen atom or lower alkyl group and p represents an integer of 1–4, can be mentioned.

Examples of the compound having a group represented by the above-mentioned formula include the compounds represented by the following formula (I):

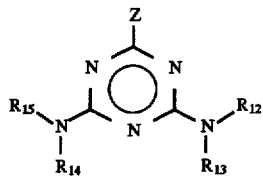

wherein Z represents $-NR_{10}R_{11}$ or phenyl group, and $R_{10}$ to $R_{15}$ each represents hydrogen atom, $-(CH_2)_pOH$ or $-(CH_2)_pOR_{16}$ provided that at least one of $R_{10}$ to $R_{15}$ is $-(CH_2)_pOH$ or $-(CH_2)_pOR_{16}$, $R_{16}$ is a lower alkyl group and p is an integer of 1–4; the compounds represented by one of the following formulae:

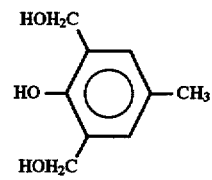

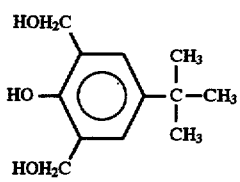

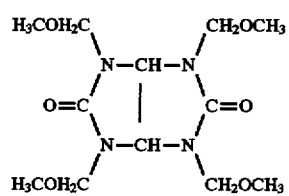

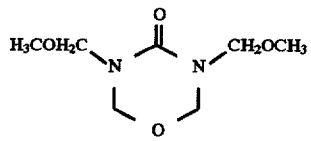

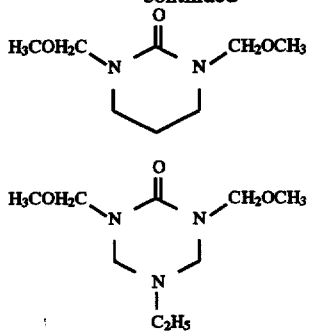

and the like.

As the lower alkyl group represented by $R_0$ and $R_{16}$, methyl, ethyl, n-propyl or n-butyl group can be mentioned, among which methyl or ethyl group is preferred.

The compounds represented by the formulae (i) and (ii) can each be produced through a condensation reaction between formaldehyde and p-cresol or t-butylphenol under a basic condition. The compounds represented by the formulae (iii) and (vi) are all known compounds disclosed in JP-A-I-293339.

As preferable examples of the compound having a group represented by $-(CH_2)_pOR_0$, hexamethoxymethylolmelamine, hexamethoxyethylolmelamine, hexamethoxypropylolmelamine or the like can be mentioned.

The photoresist composition may further contain a photo-induced acid precursor. Said photo-induced acid precursor is not particularly restricted, so far as it can generate an acid either directly or indirectly by the ray, such as ultraviolet ray, far ultraviolet ray or the like. Examples of said photo-induced acid precursor include the following:

the trihalomethyltriazine compounds disclosed in JP-A-4-163552;

the disulfone compounds disclosed in JP-A-1-57777;

the compounds represented by the following formula:

wherein $R_{17}$ and $R_{19}$ each independently represents aryl, aralkyl, alkyl, cycloalkyl or heterocyclic group which may be substituted and $R_{18}$ represents aryl group which may be substituted;

the sulfonic acid ester group-containing photo-induced acid precursors disclosed in JP-A-1-293339;

the compounds represented by the following formula:

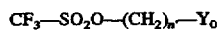

wherein $Y_0$ represents aryl group which may be substituted and n' represents 0 or 1;

the compounds represented by the following formula:

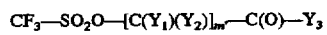

wherein $Y_1$ and $Y_2$ each independently represents alkyl, alkoxy or aryl group which may be substituted, $Y_3$ represents aryl group which may be substituted, and m' represents 1 or 2;

the compounds represented by the following formula:

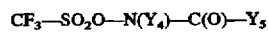

wherein $Y_4$ represents alkyl group which may be substituted and $Y_5$ represents aryl group which may be substituted;

the compounds represented by the following formula:

wherein $Y_6$ represents alkyl or aryl group which may be substituted or hydrogen atom and $Y_7$ represents aryl group which may be substituted; and the onium salts represented by one of the following formulae:

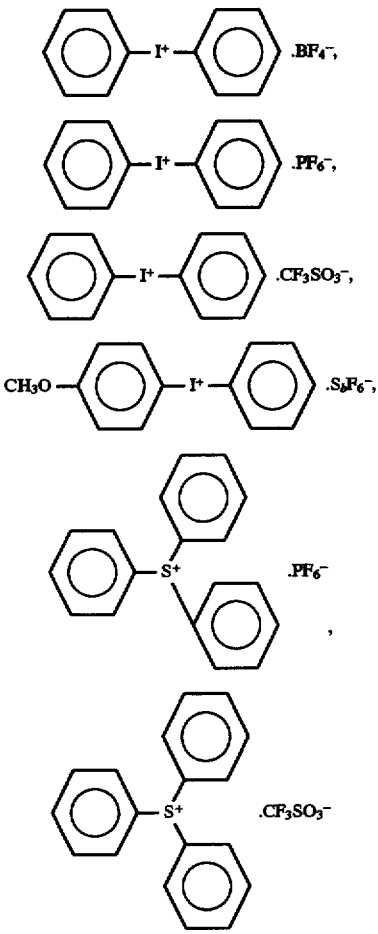

and the like.

A positive photoresist composition contains a quinonediazide compound. Examples of said quinone-diazide compound include o-naphthoquinonediazide-5-sulfonic acid ester or -sulfonic acid amide, o-naphthoquinonediazide-4-sulfonic acid ester or -sulfonic acid amide, and the like. These esters and amides can be synthesized, for example, from the phenol compounds mentioned in JP-A-2-84650 and JP-A-3-49437 as general formula (I), according to the known procedure.

Preferably, the amounts of the azo dye for use in color filters, the quinonediazide compound, the crosslinking agent and the photo-induced acid precursor are 25–100 parts by weight, 50–100 parts by weight, 10–30 parts by weight and 10–30 parts by weight, respectively, per 100 parts by weight of alkali soluble resin. Into the photoresist composition, a variety of additives conventionally used in the art, such as smoothening agent for imparting a uniform coating characteristic and the like, may be incorporated.

When a positive resist is exposed to light, a difference in solubility in alkali developer (alkaline aqueous solution)

appears between exposed and unexposed parts. Utilizing this phenomenon, the exposed part is eliminated, while the unexposed part is allowed to remain as a positive colored pattern. That is, the quinonediazide compound decomposes upon exposure to light and becomes soluble in the alkali developer, while in the unexposed area the quinonediazide compound so acts as to suppress dissolution of alkali soluble resin in the alkali developer. The quinonediazide compound remaining in the unexposed part can be decomposed by exposing the whole area to light. When the composition contains a photo-induced acid precursor, the photo-induced acid precursor functions so as to generate an acid and thereby harden the positive color pattern.

On the other hand, a negative resist contains no quinonediazide compound. The exposed part remains as a negative color pattern in this case, inversely to the case of positive resist.

As a light source for exposure, ultraviolet ray emitted from, for example, mercury lamp and the like, far ultraviolet ray, electron beam, X ray, and the like are used.

WORKING EXAMPLES

Next, this invention will be explained more concretely by referring to Examples and Referential Examples. In the Referential Examples mentioned below, the common conditions are as follows.

A color filter was produced by coating a silicon wafer with a photoresist composition by means of spinner, evaporating the solvent with heating, and the coating film thus obtained was exposed to light through a mask. Development of the film with alkali developer gave a colored pattern. The exposure was carried out by means of i-line exposing stepper HITACHI LD-5010-i (NA=0.40) manufactured by Hitachi, Ltd. As the developer, SOPD manufactured by Sumitomo Chemical Co., Ltd. was used.

Example 1

A mixture of 20 g of Suminol Milling Yellow 4G (acid dye manufactured by Sumitomo Chemical Co., Ltd.) represented by the above-mentioned formula (d) wherein X' and Y' both represent —$SO_3H$, 100 ml of thionyl chloride and 15 g of dimethylformamide was allowed to react under reflux for 30 minutes, after which the reaction mixture was cooled to room temperature, poured into ice water, and after-treated in the conventional manner. The product thus obtained was reacted with propylamine at a molar ratio of 1:2 in tetrahydrofuran to obtain an azo dye.

Example 2

The procedure of Example 1 was repeated, except that the Suminol Milling yellow 4G was replaced with Suminol Fast Yellow 2GP (acid dye manufactured by Sumitomo Chemical Co., Ltd.) and the molar ratio of the reaction was altered to 1:1. Thus, a m-phenylamino-sulfone isomer of the azo dye represented by the above-mentioned formula (c) wherein R is propyl was obtained.

Example 3

The procedure of Example 1 was repeated, except that the Suminol Milling yellow 4G was replaced with Suminol Fast Red G (acid dye manufactured by Sumitomo Chemical Co., Ltd.) represented by the following formula:

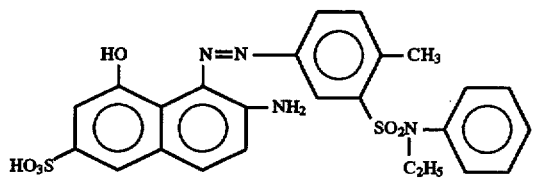

and the molar ratio of the reaction was altered to 1:1. Thus, an azo dye was obtained.

Example 4

The procedure of Example 1 was repeated, except that the propylamine was replaced with an amine represented by the following formula:

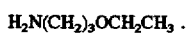

As a result, an azo dye was obtained.

Example 5

The procedure of Example 1 was repeated, except that the propylamine was replaced with an amine represented by the following formula:

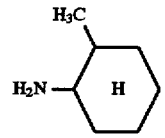

As a result, an azo dye was obtained.

Example 6

The procedure of Example 1 was repeated, except that the propylamine was replaced with an amine represented by the following formula:

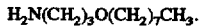

As a result, an azo dye was obtained.

Example 7

A mixture consisting of 2 g of a cresol novolac resin (weight average molecular weight 2,500) obtained from a mixture of m-cresol, p-cresol and formaldehyde (molar ratio=5/5/7.5), 2 g of the azo dye obtained in Example 1, 1 g of hexamethoxymethylol-melamine, 2 g of an o-naphthoquinonediazide-5-sulfonic acid ester of a phenol compound represented by the following formula:

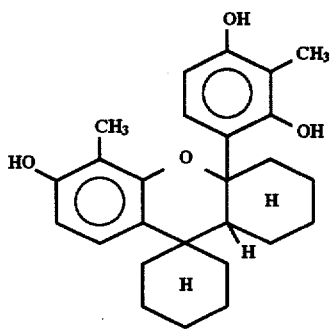

(two hydroxyl groups had been esterified on the average), 5 g of dimethylformamide and 12 g of ethyl lactate was filtered under an elevated pressure through a membrane filter to obtain a positive photoresist composition for use in color filter.

A silicon wafer on which CCD had been formed was coated with the positive resist composition obtained above by means of spinner, and then heated at 100° C. for one minute. After exposing the silicon wafer to light, the exposed part was eliminated by alkali development to obtain a positive pattern having a resolution of 0.8 μm.

The whole area of the positive pattern obtained above was exposed to light and then heated at 150° C. for 15 minutes to obtain a yellow filter element. The color filter thus obtained exhibited excellent properties at a thickness of 1 μm or less.

Examples 8–12

Color filter elements each having excellent properties were obtained by repeating the procedure of Example 7, except that the dye obtained in Example 1 was replaced with one of the azo dyes obtained in Examples 2–6.

Example 13

The yellow filter element obtained in Example 7 was over-coated with the positive resist composition of Example 9 by means of spinner. Subsequently, the procedure of Example 7 was repeated to obtain a positive pattern. The whole area of the pattern was exposed to light, after which the pattern was heated at 150° C. for 15 minutes to form a red filter element. Then, the red filter element was treated in the same manner as in Example 7, except that the Cyan Dye B mentioned in Page (9) of JP-A-2-127602 was used. Thus, a cyan filter element was obtained.

The color filter thus obtained was excellent in various properties including resolution.

INDUSTRIAL APPLICABILITY

The azo dye of this invention for use in color filters is excellent in spectral characteristics, and the color filter prepared from said azo dye according to this invention is excellent in various properties including resolution, stability of colored pattern, etc. and is free from scum.

We claim:

1. A magenta-colored or red-colored azo dye represented by one of the following formulae:

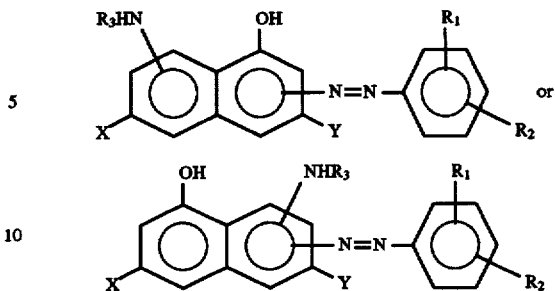

wherein $R_1$ and $R_2$ each independently represents hydrogen atom, halogen atom, alkyl group, aryloxy group, alkylcarbonylamino group, arylcarbonylamino group, alkylaryloxy group, dialkylaryloxy group, sulfonic acid group or —$SO_2NHR$ in which R represents alkyl, cyclohexylalkyl, alkoxy, alkoxyalkylaryl or alkylcarbonyloxy group, $R_3$ represents lower alkylcarbonyl group, arylcarbonyl group or arylsulfonyl group, and X and Y each independently represents sulfonic acid group or —$SO_2NHR$, provided that at least one of $R_1$, $R_2$, X and Y represents —$SO_2NHR$ and with the proviso that when $R_1$ or $R_2$ is —$SO_2NH$—R where R is alkyl, then $R_3$ is not lower alkylcarbonyl.

2. The azo dye according to claim 1, wherein R represents a $C_3$ to $C_{30}$ alkyl group or an ether group of the formula $C_nH_{2n+1}OC_mH_{2m+1}$ wherein n and m each represent an integer of 1 or higher provided that the sum of n+m is an integer in the range of from 3 to 30.

3. The azo dye according to claim 1, wherein $R_1$ is hydrogen.

4. The azo dye according to claim 3, wherein $R_2$ is an alkyl group, an aryloxy group, or an alkylcarbonylamino group.

5. The azo dye according to claim 1, wherein $R_3$ is an alkylcarbonyl group.

6. The azo-dye according to claim 4, wherein $R_3$ is an alkylcarbonyl group.

7. A method for producing a color filter having at least one color filter element, which comprises the steps of:

a) forming on a substrate an organic solvent-coating of a photoresist composition containing a magenta-colored or red-colored azo dye represented by one of the following formulae:

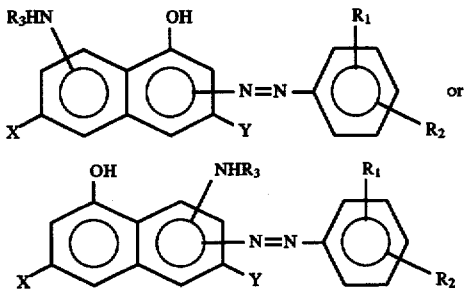

wherein $R_1$ and $R_2$ each independently represents hydrogen atom, halogen atom, alkyl group, aryloxy group, alkylcarbonylamino group, arylcarbonylamino group, alkylaryloxy group, dialkylaryloxy group, sulfonic acid group or —$SO_2NHR$ in which R represents alkyl, cyclohexylalkyl, alkoxy, alkoxyalkylaryl or alkylcarbonyloxy group, $R_3$ represents lower alkylcarbonyl group, arylcarbonyl group or arylsulfonyl group, and X and Y each independently represents sulfonic acid group or —$SO_2NHR$, provided that at least one of $R_1$, $R_2$, X and Y represents —$SO_2NHR$ and drying the organic solvent-coating to form an adhering layer, said composition comprising an alkali soluble resin and said dye being present in the organic solvent-coating in an amount of ¼ or more in terms of ratio by weight based on the alkali soluble resin;

b) exposing a specific part of the above-mentioned adhering layer to a radiation ray selected from the group consisting of ultraviolet ray, far ultraviolet ray, electron beam, x-ray and ion beam; and c) developing the exposed part or unexposed part with alkali to form a pattern and thereby produce a filter element.

8. A method according to claim 7, wherein said photoresist composition contains a novolac resin and a quinonediazide compound.

9. A method according to claim 8, wherein said photoresist composition further contains a crosslinking agent.

10. A method according to claim 9, wherein said crosslinking agent is a compound having a group represented by the following formula:

—$(CH_2)_pOR_0$ wherein $R_0$ represents hydrogen atom or lower alkyl group and p represents an integer of 1 to 4.

11. A method according to claim 7, which further comprises, prior to said step (a), forming on said substrate, a first filter element having a different color than said azo dye, by depositing on said substrate a dye-containing photoresist layer; pattern-wise imaging said photoresist layer; and developing said photoresist to obtain a pattern and thereby produce said first filter element.

* * * * *